United States Patent
Lin

(12) 
(10) Patent No.: US 6,283,592 B1
(45) Date of Patent: Sep. 4, 2001

(54) NOSE PAD ASSEMBLING FOR EYEGLASS FRAME

(76) Inventor: Liken Lin, No. 35, Sec. 4, Chung Yang Rd., Tu-Cheng, Taipei Hsien (TW)

(*) Notice: Subject to any disclaimer, the term of this patent is extended or adjusted under 35 U.S.C. 154(b) by 0 days.

(21) Appl. No.: 09/756,109

(22) Filed: Jan. 9, 2001

(51) Int. Cl.[7] .................................... G02C 5/12

(52) U.S. Cl. ............................ 351/136; 351/65

(58) Field of Search .................. 351/136, 138, 351/137, 139, 65, 70, 76, 78, 80, 41

(56) References Cited

U.S. PATENT DOCUMENTS 5,694,194 * 12/1997 Morrison .......................... 351/137

* cited by examiner

Primary Examiner—Hung Xuan Dang
(74) Attorney, Agent, or Firm—Jacobson Holman, PLLC

(57) ABSTRACT

A nose pad assembling for eyeglass frame includes a pair of nose pads mounted on the inner side of eyeglass frame respectively. The feature of the device is in that a pair of inserting tube integrated into the inner side of eyeglass frame. An inserting post with a piece of thermoplastic membrane on one end is arranged on the rear side of the nose pad. By inserting the inserting post into the receiving tube and heating the thermoplastic membrane from the bottom of the receiving tube, the inserting post is fixed firmly with the receiving tube for connecting the nose pad with the eyeglass frame.

1 Claim, 2 Drawing Sheets

NOSE PAD ASSEMBLING FOR EYEGLASS FRAME

BACKGROUND OF THE INVENTION

1. Field of the Invention

The present invention relates to a nose pad assembling for eyeglass frame, especially to a nose pad with an inserting post, having a piece of thermoplastic membrane, on the rear side. A pair of receiving tubes are spaced laterally apart on the inner side of two orbitals of eyeglass frame. The inserting post is inserted into the receiving tube and the thermoplastic membrane is heated from the bottom of the receiving tube for firmly connecting the inserting post with the receiving tube. Therefore, users can replace the damaged nose pads easily.

2. Description of the Prior Art

People who are near-sight or long-sighted need to wear glasses for eyeshot correction and clear vision. The conventional eyeglass frame includes a pair of pivotally attached earpieces for hooking with users' ears. A pair of nose pads are arranged laterally apart on the inner side of two orbitals of eyeglass frame for fixing eyeglass on users' faces. Generally, nose pads are welded on eyeglass frame.

However, nose pads are connected with eyeglass frame only by an inserting post that is made of tenuous linear material. Thus the tenuous inserting post is easily get hit and broken on impact. Users need to go to opticians for repair. Repairing methods depends on the different positions of broken area. The most common way of repairing is to weld the inserting post onto the frame. But this will lead to a bit shift of eyeglass frame from the original position so that users wearing eyeglasses are not as comfortable as before.

By the way, if users have no spare eyeglasses, there must be much inconvenience in their daily life during the period of repairing eyeglasses.

SUMMARY OF THE INVENTION

It is therefore a primary object of the present invention to provide a nose pad assembling for eyeglass frame having an inserting post, covered with a piece of thermoplastic membrane on one end, on rear side thereof. On the inner side of two orbitals of eyeglass frame, a pair of receiving tubes are integrated with the eyeglass frame. After inserting the inserting post into the receiving tube, the thermoplastic membrane on the bottom of receiving tube is melted by heat so as to fix the nose pad firmly on the inner side of orbitals. In such way, users can easily replace the damaged nose pad or inserting post by themselves.

BRIEF DESCRIPTION OF THE DRAWINGS

The accomplishment of the above-mentioned object of the present invention will become apparent from the following description and its accompanying drawings which disclose illustrative an embodiment of the present invention, and are as follows.

DETAILED DESCRIPTION OF THE PREFERRED EMBODIMENT

Figure 1:
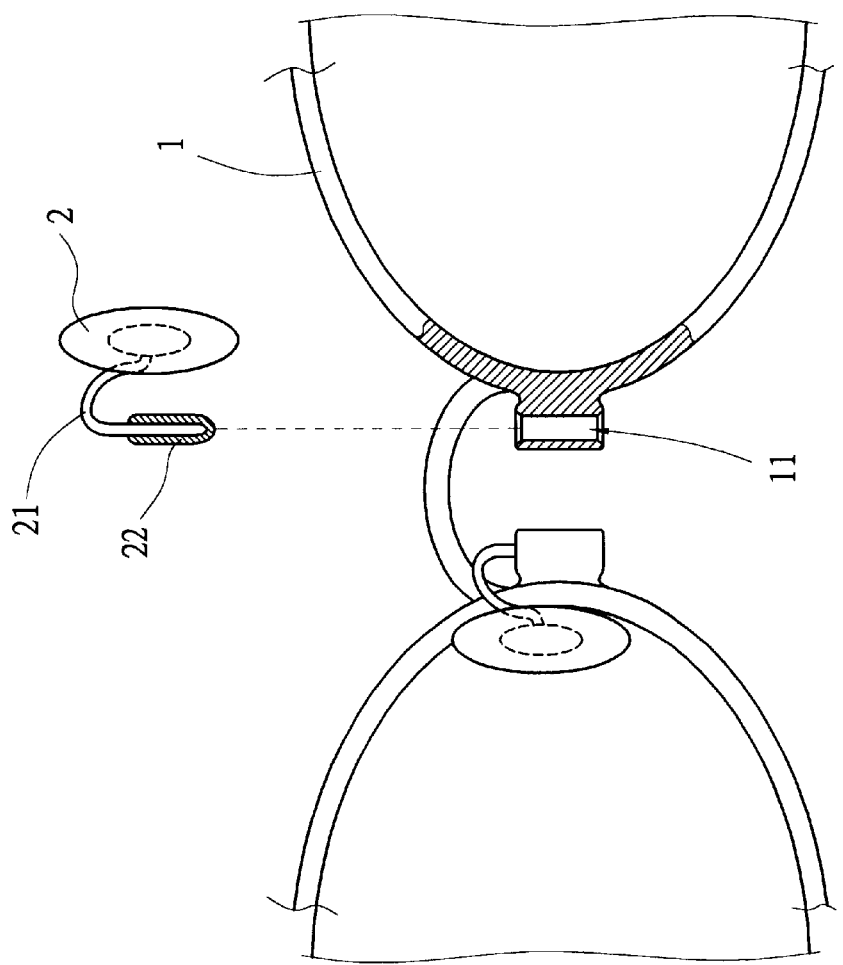
FIG. 1 is an assembling view, partially in section, of a pen-base barcode reader according to the present invention.
Figure 2:
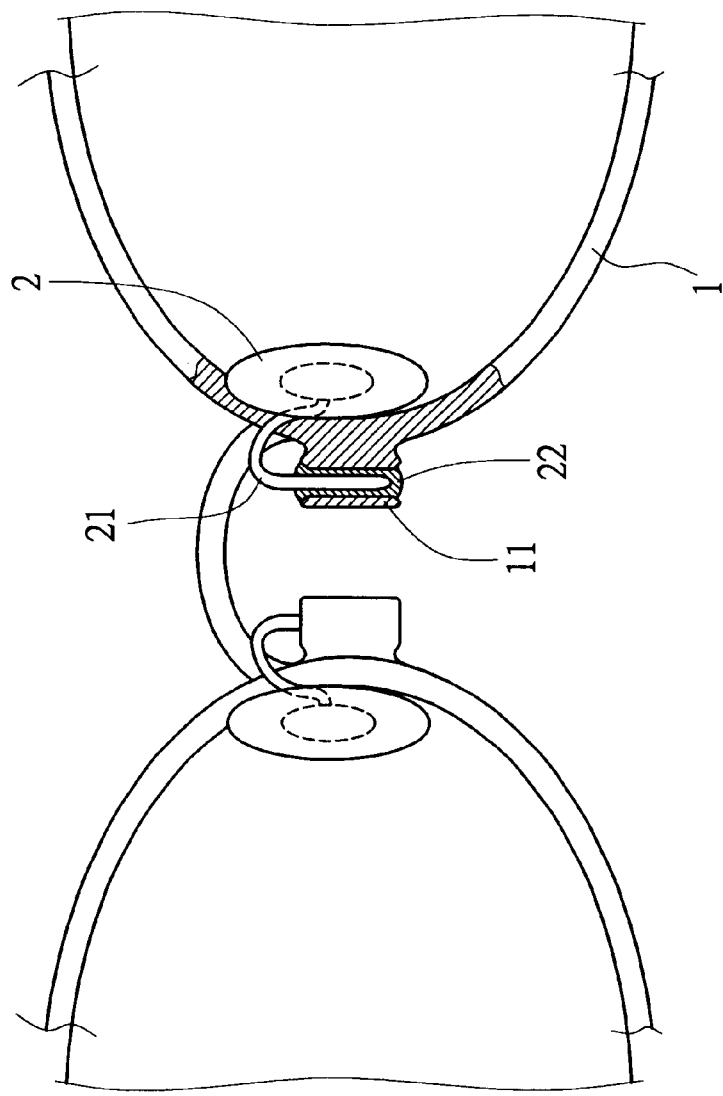
FIG. 2 is an assembling view, partially in section, of the present invention.

Refer to FIG. 1 & FIG. 2, the present invention includes a nose pad 2 is disposed on the inner side of eyeglass frame 1 respectively. The feature of the invention is in that a receiving tube 11 integrated with the eyeglass frame is arranged on the inner side of each orbital of eyeglass frame 1 respectively. An inserting post 21 is fastened on the rear side of the nose pad 2 for connection with the receiving tube 11. A piece of thermoplastic membrane 22 is covered on the other end of the inserting post 21.

According to the structure mentioned above, the inserting post 21 on the rear side of the nose pad 2 is inserting into the receiving tube 11 of the eyeglass frame 1. Afterwards, by heating the thermoplastic membrane 22 from the bottom of the receiving tube 11, the inserting post 21 is fastened firmly with the receiving tube 11 by the melted thermoplastic membrane 22. Thus the nose pad 2 is fixed firmly on the inner side of the eyeglass frame 1.

Therefore, if the inserting post 21 on the rear side of the nose pad 2 is broken or out of order, users can heat the bottom of the receiving tube 11 of the eyeglass frame 1 again in order to take off the broken inserting post 21. Repeat the steps mentioned above, users can replace the damaged nose pad 2 with a new one immediately by themselves without necessity of waiting for a long time.

It is to be understood that the drawings are designed for purposes of illustration only, and are not intended for use as a definition of the limits and scope of the invention disclosed.

What is claimed is:

1. A nose pads assembling for eyeglass frame comprising, a pair of nose pads mounted on the inner side of eyeglass frame;

a pair of receiving tubes spaced integrated with eyeglass frame;

wherein said nose pad having an inserting post on the rear side thereof, a piece of thermoplastic membrane is attached on one end of said inserting post; said inserting post on the rear side of said nose pad is inserted into said receiving tube and said thermoplastic membrane is heated from the bottom of said receiving tube so that said nose pad is fixed firmly with said receiving tube of eyeglass frame.

* * * * *